United States Patent [19]

Hamaguchi et al.

[11] Patent Number: 5,185,110

[45] Date of Patent: Feb. 9, 1993

[54] METHOD OF PRODUCING POROUS CERAMIC FILTER, USING CORDIERITE COMPOSITION INCLUDING TALC AND SILICA POWDERS

[75] Inventors: Kunikazu Hamaguchi; Kazuhiko Kumazawa, both of Nagoya; Seiichi Asami, Okazaki, all of Japan

[73] Assignee: NGK Insulators, Ltd., Japan

[21] Appl. No.: 675,805

[22] Filed: Mar. 27, 1991

[30] Foreign Application Priority Data

Mar. 30, 1990 [JP] Japan .................................. 2-86787

[51] Int. Cl.$^5$ ...................... B29C 65/00; C04B 35/64
[52] U.S. Cl. ....................................... 264/44; 264/63; 264/177.12
[58] Field of Search ..................... 264/42, 43, 63, 44, 264/177.12

[56] References Cited

U.S. PATENT DOCUMENTS 4,280,845  7/1981  Matsuhisa et al. .................... 106/62
5,030,398  7/1991  Hamanaka et al. .................... 264/63

FOREIGN PATENT DOCUMENTS 58-70814    4/1983  Japan .
61-129015   6/1986  Japan .
61-54750   11/1986  Japan .

Primary Examiner—James Lowe
Assistant Examiner—Christopher A. Fiorilla
Attorney, Agent, or Firm—Parkhurst, Wendel & Rossi

[57] ABSTRACT

A method of producing a porous ceramic filter, using a cordierite precursor or starting composition including a talc powder component and a silica powder component, such that particles of the talc powder component and the silica powder component whose size is not less than 150 μm constitute not more than 3% by weight of the starting composition, while particles of the talc and silica powder components whose size is not more than 45 μm constitute not more than 25% by weight of the starting composition. A green body for the porous ceramic honeycomb filter formed of this starting composition is fired to react the starting composition to form cordierite and produce the desired porous ceramic honeycomb filter.

8 Claims, 2 Drawing Sheets

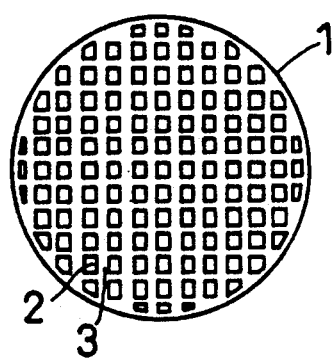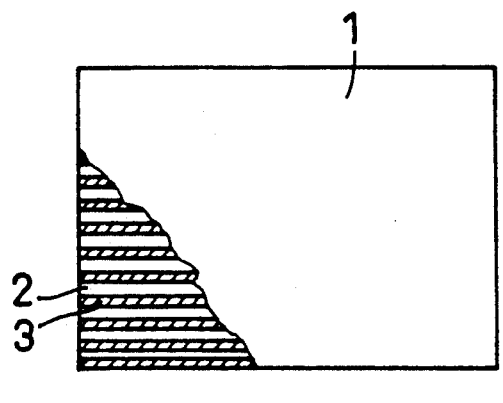
FIG. 1A   FIG. 1B
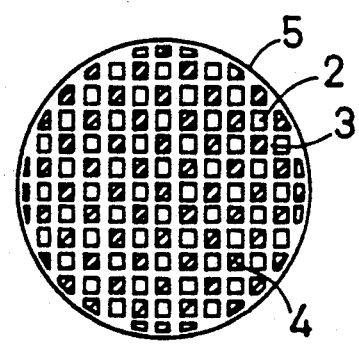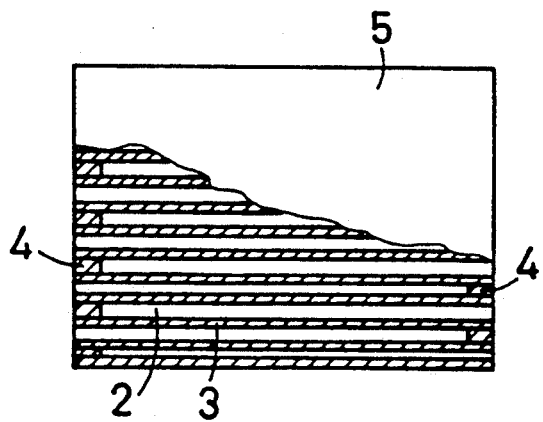
FIG. 2A   FIG. 2B

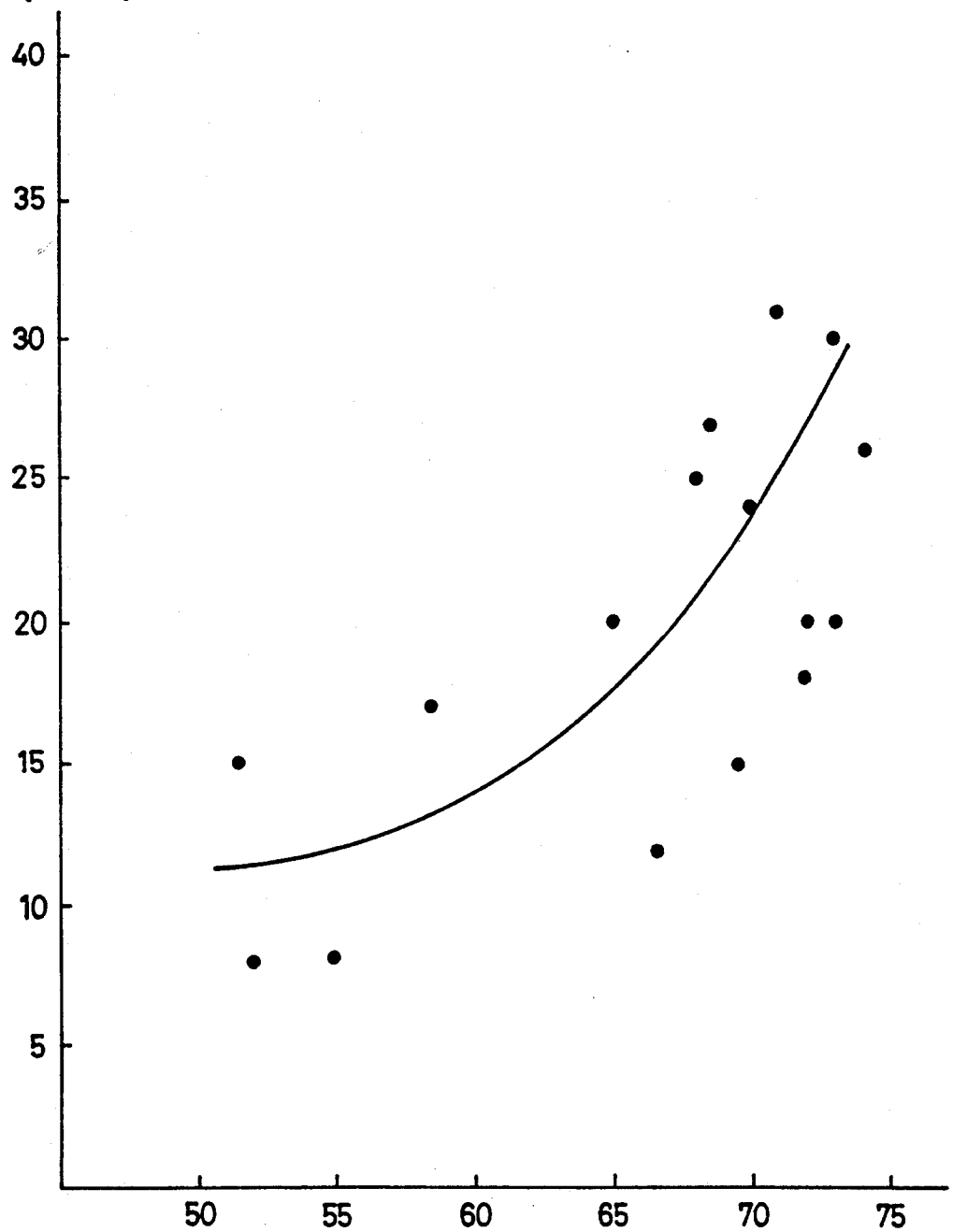

METHOD OF PRODUCING POROUS CERAMIC FILTER, USING CORDIERITE COMPOSITION INCLUDING TALC AND SILICA POWDERS

BACKGROUND OF THE INVENTION

1. Field of the Invention

The present invention relates to a method of producing a porous ceramic filter formed of a cordierite composition, and more particularly to a method of producing such ceramic filter suitable for removing soot or other particulate matter contained in exhaust gases emitted by a diesel engine.

2. Discussion of the Prior Art

Recently, various types of porous honeycomb filters using a cordierite honeycomb structure with porous partition walls have been proposed as a porous ceramic filter capable of functioning to filter fluids such as gases. For example, porous honeycomb filters are used as a so-called "diesel particulate filter" for removing particulate matter from exhaust gases emitted by a diesel engine. These diesel particulate filters are roughly classified into a high-trapping-efficiency type, and a low-trapping-efficiency type. These two types are selectively employed depending upon the specific requirement.

As a porous ceramic honeycomb filter having improved filtering capability, laid-open Publication No. 61-129015 of unexamined Japanese Patent Application proposes an exhaust emission purifying filter in which the size of the pores formed adjacent to the surfaces of the partition walls of the honeycomb structure is specifically controlled. Described more particularly, those pores consist of relatively small pores whose diameters fall within a range of 5-40μm, and relatively large pores whose diameters fall within a range of 40-100μm. This exhaust emission purifying filter is prepared from a ceramic composition with which a suitable foaming or blowing agent is mixed. A desired green honeycomb structure formed of this ceramic composition is fired at an elevated temperature, whereby pores are formed in the partition walls of the fired honeycomb structure, due to heating of the ceramic composition in the presence of the foaming agent mixed therein.

Laid-open Publication No. 61-54750 of examined Japanese Patent Application discloses porous honeycomb filters in a wide range of trapping capacity from a high-trapping-efficiency type to a low-trapping-efficiency type. The porous honeycomb filters disclosed therein have controlled open porosities (ratio of a volume of open pores to that of non-open pores) and controlled average sizes of the pores. Further, laid-open Publication No. 58-70814 of unexamined Japanese Patent Application teaches that the pressure loss of a porous ceramic honeycomb filter can be lowered by forming the partition walls of the honeycomb structure with large pores having 100 μm or larger sizes, for example.

Generally, the following three characteristics are important in determining the overall filtering function or capability of a porous ceramic honeycomb filter. These characteristics are: a) trapping efficiency (ratio of the particulate matter removed from a subject fluid, to those not removed); b) pressure loss (amount of pressure drop of the subject fluid flowing through the filter); and c) nominal operation time (time duration from the commencement of use of the filter to the time at which the pressure loss increases to an upper limit). In this respect, it is significant to note that the trapping efficiency is proportional to the pressure loss. Namely, an increase in the trapping efficiency results in an undesirable increase in the pressure loss, and a consequent decrease in the operation time. If the filter is adapted for a comparatively reduced amount of pressure loss, the operation time can be prolonged, but the trapping efficiency is unfavorably lowered.

The most important characteristic of the porous ceramic honeycomb filter is the trapping time, i.e., the time duration for which the filter can operate with the pressure loss held below the permissible upper limit. For the reason indicated above, however, it has been considered difficult to increase the trapping time while maintaining a sufficiently high trapping efficiency. In this respect, it is noted that an increase in the nominal operation time of a porous ceramic honeycomb filter means a decrease in the required volume of the filter for a specific application, and the decrease in the required volume contributes to an improvement in the thermal shock or stress resistance of the filter. Therefore, it is desirable to increase the operation time (life expectancy) of the filter, particularly where the contaminated or clogged filter can be reclaimed by burning out the contaminants or particulate matters, as in the case of the diesel particulate filter used for a diesel engine.

SUMMARY OF THE INVENTION

It is therefore an object of the present invention to provide a method of producing an improved porous ceramic filter which has a prolonged nominal operation time and a reduced pressure loss, while maintaining a sufficiently high trapping efficiency.

The above object may be achieved according to the principle of the present invention, which provides a method of producing a porous ceramic honeycomb filter comprising the steps of (a) preparing a starting composition including a talc powder component and a silica powder component, such that particles of the talc powder component and the silica powder component whose size is not less than 150 μm constitute not more than 3% by weight of the starting composition, while particles of the talc and silica powder components whose size is not more than 45μm constitute not more than 25% by weight of the starting composition; (b) forming a green body for the porous ceramic filter, by using the prepared starting composition; and (c) firing the green body to react the starting composition and produce the porous ceramic honeycomb filter.

The method of the present invention which uses the starting composition prepared as described above permits the production of a porous ceramic honeycomb filter whose major crystal phase is cordierite and whose pores consist principally of pores having diameters of 10-50 μm, with a small number of pores whose diameters are 100 μm or more. This porous ceramic honeycomb filter is given a relatively long nominal operation time, without lowering the filtering efficiency. It is recognized that the pores whose diameters are not less than 100 μm greatly influence the trapping efficiency and the pressure loss, namely, an increase in the number of the pores whose diameters are 100 μm or more will considerably reduce the filtering efficiency. It is also noted that the pores whose diameters fall within a range of 10-50 μm contribute to an increase in the operation time of the filter, and to a decrease in the pressure loss. More specifically, the pressure loss of a fluid flowing through the filter can be minimized to effectively remove the particulate matter from the fluid, by increasing the number of such relatively small pores of 10–50 μm. In other words, the trapping function or capability of the porous ceramic honeycomb filter can be substantially improved, by increasing the number of such small pores of 10–50 μm, while controlling the number of the pores whose sizes are smaller than 10 μm or larger than 100 μm, as described above. Thus, the porous ceramic honeycomb filter produced according to the present method has a prolonged operation time with a reduced pressure loss, while maintaining a high trapping efficiency (90% or more). The present method is particularly suitable for producing a porous ceramic honeycomb filter for emissions from a diesel engine, i.e., "diesel particulate filter".

The porous ceramic honeycomb filter produced according to the method of the present invention generally has an open porosity of 45–60%, a pore volume of not more than 10% which consists of the pores whose diameters are 100 μm or more, and a pore volume of not less than 65% which consists of the pores whose diameters fall within a range of 10–50 μm. Preferably, the pore volume provided by the pores whose diameters are 100 μm or more is 5% or less, while the pore volume provided by the pores whose diameters are 10–50 μm is 70% or more. If the open porosity of the filter is less than 45%, the operation time tends to be shortened with a relatively large pressure loss of the subject fluid, even if the pore size is controlled as described above. If the open porosity of the filter exceeds 60%, the mechanical strength of the filter is insufficient, and a pore-forming agent such as graphite must be used in a large amount, which unfavorably increases the required firing time and consequently the required production cycle time.

According to the method of the present invention for producing a porous ceramic honeycomb filter, there is first prepared a starting composition which includes a talc powder component such as talc or calcined talc, and a silica powder component such as non-crystalline silica, and which further includes suitable additives such as kaoline, calcined kaoline, alumina and aluminum hydroxide. Generally, the starting composition comprises 42–56% by weight of $SiO_2$, 30–45% by weight of $Al_2O_3$ and 12–16% by weight of MgO.

This cordierite composition is prepared according to the principle of the invention, such that the particles of the talc powder and the silica powder whose size is 150 μm or larger constitute 3% or less by weight of the entire starting composition, while the particles of the talc and silica powders whose size is 45 μm or less constitute 25% or less by weight of the entire starting composition. The use of the thus prepared starting composition permits the produced porous ceramic honeycomb filter to have an effectively increased nominal operation time with a limited increase in the pressure loss, as well as a trapping efficiency as high as 90% or more. The volume of the pores having 100 μm or larger sizes can be further reduced while the volume of the pores having 10–50 μm sizes can be increased, if the talc and silica particles whose size is 150 μm or more constitute not more than 1% by weight of the entire starting composition and the particles whose size is 45 μm or less constitute not more than 20% by weight of the entire starting composition.

For adjusting the porosity and other properties of the filter to be produced, a pore-forming agent such as graphite is added to the starting composition prepared as described above. Further, a plasticizer and a binder which are conventionally used are added to the obtained mixture, to plasticize the mixture into a formable batch for extrusion. By using the thus prepared batch, a green honeycomb body for the desired porous ceramic honeycomb filter is formed by extrusion. The green body is dried, and the dried green body is fired at a temperature between 1380° C. and 1440° C. In this way, the desired porous ceramic body is produced.

The pores are formed in the fired filter, due to firing reaction of the starting composition, based primarily on the framework constituted by the talc powder component such as talc or calcined talc and the silica powder component such as non-crystalline silica. In particular, the use of the silica powder component which is typically non-crystalline silica facilitates the adjustment of the pore size, since the silica powder remains stable at a higher temperature than the other materials, and is melted and diffused at 1350° C. or higher. The silica powder permits the formation of the pores having a relatively constant size, which corresponds to the particle size of the starting powder.

While the pores are formed based on the framework constituted by the pore-forming agent and other additives as well as the talc and silica powder components, the process in which the pores arc formed can be explained as follows. Initially, the pore-forming agent such as graphite disappears or is burnt out at a temperature in the neighborhood of 1000° C. Then, the reaction of the talc powder occurs, and a liquid phase of cordierite appears at a temperature of about 1280° C. or higher, causing minute pores to be formed by the framework of the talc powder component. A subsequent reaction of this component will cause reduction of the framework. On the other hand, the silica powder component is melted and diffused at a further elevated temperature of about 1350° C. or higher, creating minute pores. Therefore, the size of the pores formed later by the framework of the silica powder controls the size of the pores formed in the filter produced, such that the substantially constant size of the pores in the filter corresponds to the particle size of the silica powder. For forming the pores whose sizes fall within a range of 10–50 μm, it is particularly desirable to use the silica powder whose average particle size ranges from 30 μm to 50 μm.

In the case of a porous ceramic honeycomb filter like the "diesel particulate filter", it is important to reduce the coefficient of thermal expansion and increase the resistance to thermal stresses. Such a porous ceramic honeycomb filter is heat-treated to burn out the contaminants such as soot deposited on the porous partition walls, when the pressure loss of the subject fluid reaches a permissible upper limit during use. In this instance, there is a possibility of cracking of the filter due to different temperatures within the body of the filter during the firing to burn out the contaminants. In view of this possibility, it is required to reduce the thermal expansion coefficient and improve thermal stress resistance of the filter. Where the porous ceramic honeycomb filter is formed of a cordierite composition, the filter is generally required to have a relatively large pore size and a relatively high porosity, for assuring an adequate relationship among the filtering efficiency, pressure loss and operation time (life expectancy). In the case of a raw cordierite precursor material, however, the starting composition is required to have a relatively large particle size, which makes it difficult to reduce the thermal expansion coefficient of the filter produced.

As indicated above, the use of a silica powder component (e.g., non-crystalline silica) whose average particle size is 30–50 μm is effective to control the pore size distribution of the produced filter so as to increase the number of the 10–50 μm pores. If the same object is to be attained by means of the talc powder component, the average particle size of the talc powder should be as large as 100 μm or more. In this case, too, the filter suffers from an excessively high coefficient of thermal expansion.

In view of the above, it is preferable to use the talc powder component whose average particle size is 80 μm or less. Further, it is recommended to use the silica powder component whose average particle size ranges from 30 μm to 50 μm, so that the number of the 10–50 μm pores is increased. In other words, the thermal expansion coefficient of the filter produced is considerably high, when the average particle size of the talc powder is 100 μm or more. To avoid this, the talc powder composition is adjusted so that the average particle size is as small as possible, and the maximum average particle size of the talc powder is preferably 80 μm, as indicated above. Further, the non-crystalline silica or other silica powder is adjusted to assure a relatively large number of the 10–50 μm pores. If a porous filter having a honeycomb structure is formed from the cordierite composition adjusted as described above, the coefficient of thermal expansion of the filter is reduced to 0.8 or smaller along the A axis, and 1.4 or smaller along the B axis. Further, the filter is capable of exhibiting a sufficiently high thermal shock resistance at a temperature of 850° C. or higher, where the filter has an outside diameter of 118mm and a height of 150 mm.

It will be generally understood from the above explanation that the thermal expansion of the ceramic filter prepared from a starting composition is largely affected by the particle size of the talc powder, while some filters such as the diesel particulate filter which have a large pore size inherently require the use of a talc powder whose particle size is relatively large, which results in increasing the thermal expansion coefficient of the filter produced. According to the present invention, however, the pores having a relatively large size are formed by using the silica powder (non-crystalline silica) having a particle size larger than that of the conventionally used silica powder, while the thermal expansion coefficient of the filter is lowered by using the talc powder having a comparatively small particle size. The use of the relatively coarse silica powder whose average particle size is 30–50 μm permits the use of a relatively fine talc powder, thereby making it possible to suitably control the size of the minute pores formed in the filter produced.

BRIEF DESCRIPTION OF THE DRAWINGS

The above and optional objects, features and advantages of the present invention will be better understood by reading the following detailed description of the present invention, when considered in connection with the accompanying drawings, in which:

FIG. 1(a) is a front elevational view of an example of a porous ceramic honeycomb structure produced according to one embodiment of the present invention;

FIG. 1(b) is a side elevational view partly in cross section of the honeycomb structure of FIG. 1(a);

FIG. 2(a) is a front elevational view of a porous ceramic honeycomb filter obtained from the honeycomb structure of FIGS. 1(a) and 1(b);

FIG. 2(b) is a side elevational view partly in cross section of the honeycomb filter of FIG. 2(a); and FIG. 3 is a graph indicating a relationship between the nominal operation time and the percent of 10–50 μm pores of the specimens of the honeycomb filter in Example 1 whose trapping efficiency is 90% or higher.

DETAILED DESCRIPTION OF THE INVENTION

Referring to FIGS. 1(a) and 1(b), there is shown one example of a porous ceramic honeycomb structure 1 which is produced by forming a green body from a cordierite precursor or starting composition prepared as described above and firing the green body. The green body is formed and fired in a known manner. As shown in the front and side elevational views of FIGS. 1(a) and 1(b), the porous ceramic honeycomb structure 1 has porous ceramic partition walls 3 which cooperate to define a multiplicity of channels 2. As known in the art, these channels 2 are closed at one of opposite ends of the honeycomb structure 1, by suitable plugs 4, as indicated in the front and side elevational views of FIGS. 2(a) and 2(b), whereby a porous ceramic honeycomb filter 5 is produced.

To further clarify the principle of the present invention, there will be illustrated some examples of the invention. It is to be understood, however, that the invention is not limited to the details of the illustrated examples, and that the invention may be embodied with various changes and modifications which may occur to those skilled in the art, in view of the foregoing and following teachings.

EXAMPLE 1

Components as indicated in TABLES 1-1 and 1-2 were mixed together, to prepare batch Nos. 1 through 37 as specified in TABLES 2-1 through 2-6. To each batch, there were added 4.0 parts by weight of methyl cellulose per 100 parts by weight of the batch material, and water. The mixture was kneaded into the corresponding green batch for extrusion. The thus prepared green batches were extruded in a known manner, to produce respective green cylindrical honeycomb structures. Each green honeycomb structure has a rib (partition wall) thickness of 430 μm, 16 cells per square centimeter ($cm^2$), a diameter of 118 mm, and a height of 152 mm. The green honeycomb structures obtained from the individual batch Nos. 1-37 were dried, and fired under the conditions indicated in TABLES 2-4, 2-5 and 2-6.

The thus fired honeycomb structures were evaluated or tested in terms of the thermal expansion coefficient within a temperature range of 40°–800° C., porosity, percentage of the 100 μm or larger pores, percentage of the 10–50 μm pores, amount of the crystallized cordierite, and thermal shock resistance. The sintered honeycomb structures were closed at one of the opposite ends, by suitable plugs as indicated at 4 in FIGS. 2(a) and 2(b), whereby the corresponding filters were prepared. The filters were evaluated or tested in terms of the initial pressure loss, trapping efficiency, and operation time. The results of the evaluation and test are indicated in TABLES 3-1 through 3-4. Dots in FIG. 3 represent the relationship between the operation time and the percent of the 10–50 μm pores of the filter specimens whose trapping efficiency is 90% or more.

It will be understood from TABLES 1-1, and 3-1 through 3-4 that the filter specimens corresponding to batch Nos. 1, 2, 3, 4, 5, 6, 21 and 33 have relatively low percent values of the 10-50 μm pores and relatively short operation times, because of a large amount of the powder particles whose size is 45 μm or less. It will be also understood that the filter specimens corresponding to batch Nos. 17, 18, 19, 20, 28 and 37 have comparatively high percent values of the 150 μm or larger pores and comparatively low trapping efficiency values, because of a large amount of the powder particles whose size is 100 μm or more. It will be further understood that the filter specimens corresponding to batch Nos. 33, 34, 35, 36 and 37 have relatively small percent values of the 10-50 μm pores and relatively short operation times, because no silica powder was used.

It will be understood that the filter specimens corresponding to batch Nos. 7, 10, 11, 14, 15, 22, 23, 26, 27, 29, 30, 31 and 32 have excellent trapping efficiency and operation time, relatively low coefficients of thermal expansion, and high thermal shock resistance (thermal destruction temperature of 850° C. or higher), because of relatively small percent values of the 150 μm or larger particles and the 45 μm or smaller particles and the use of silica powder whose average grain size is about 30-50 μm. It will be also understood that the filter specimens corresponding to batch Nos. 9, 13, 17, 21 and 25 do not have sufficiently long operation time, because of the use of silica powder whose average particle size is 15 μm, and relatively small percent values of the 10-50 μm pores. It will be further recognized that the filter specimens corresponding to batch Nos. 8, 12, 16 and 24 have more or less increased percent values of the 100 μm or larger pores, more or less lowered trapping efficiency values, and comparatively high coefficients of thermal expansion, because of the use of silica powder whose average particle size is 70 μm.

TABLE 1

| | (wt. %) | | Average Particle | Chemical Composition (wt. %) | | | | | | |
|---|---|---|---|---|---|---|---|---|---|---|
| | >150 μm | <45 μm | Size (μm) | Ig. loss | $SiO_2$ | $Al_2O_3$ | MgO | $TiO_2$ | $Fe_2O_3$ | CaO + $Na_2O$ + $K_2O$ |
| Talc A | 0 | 85 | 20 | 5.6 | 60.2 | 1.4 | 30.4 | — | 1.0 | 0.6 |
| Talc B | 0.5 | 60 | 40 | 5.5 | 60.2 | 1.3 | 30.5 | — | 1.0 | 0.5 |
| Talc C | 1.0 | 40 | 60 | 5.1 | 59.9 | 1.5 | 30.9 | — | 1.0 | 0.5 |
| Talc D | 6.0 | 20 | 80 | 5.5 | 59.7 | 1.2 | 30.6 | — | 1.1 | 0.6 |
| Talc E | 30.0 | 5 | 120 | 5.7 | 60.4 | 1.2 | 30.4 | — | 1.5 | 0.7 |
| Calcined Talc A | 1.0 | 40 | 50 | 0.5 | 63.5 | 1.5 | 32.7 | — | 1.0 | 0.8 |
| Calcined Talc B | 1.0 | 60 | 40 | 0.5 | 63.5 | 1.5 | 32.7 | — | 1.0 | 0.8 |
| Kaoline | 0 | 98 | 9 | 13.9 | 45.5 | 38.8 | — | 0.8 | 0.3 | 0.2 |
| Calcined Kaoline | 0 | 100 | 2 | 0.1 | 53.1 | 45.1 | — | 0.9 | 0.4 | 0.2 |
| Alumina | 0 | 100 | 2 | 0.3 | — | 99.5 | — | — | — | 0.2 |
| Aluminum Hydroxide | 0 | 100 | 2 | 34.5 | — | 65.0 | — | — | — | 0.2 |
| Silica A | 0.5 | 90 | 15 | 0.1 | 99.7 | 0.1 | — | — | — | — |
| Silica B | 1.0 | 60 | 30 | 0.1 | 99.7 | 0.1 | — | — | — | — |
| Silica C | 3.0 | 40 | 50 | 0.1 | 99.7 | 0.1 | — | — | — | — |
| Silica D | 5.0 | 20 | 70 | 0.1 | 99.7 | 0.1 | — | — | — | — |
| Pore-Forming Agent | 0.2 | 55 | 40 | 99.7 | — | — | — | — | 0.2 | — |

NOTES:
The JIS standard sieve (wet type) was used to determine: weight percent of the 150 μm and larger particles; weight percent of the 45 μm and smaller particles of talc; and average particle size of talc.
The weight percents of the 45 μm and smaller particles and the average particle sizes of the other components were determined by a laser diffraction method.

TABLE 2

| Batch No. | Preparation Composition (wt. %) | | | | | | | Pore-forming Agent (wt. %) | wt. % of Talc, Calcined Talc and Silica | | Average Particle sIZE (μm) | | °C.* | Firing Conditions | |
|---|---|---|---|---|---|---|---|---|---|---|---|---|---|---|---|
| | Talc | Calcined Talc | Kaoline | Calcined Kaoline | Alumina | Aluminum Hydroxide | Silica | | >150 μm | <45 μm | Talc | Silica | | Max. Temp. | Hold Time |
| 1  | (A) 30.0 | (A) 10.0 | 14.0 | 9.0 | 12.5 | 14.5 | (A) 10.0 | 20.0 | 0.2 | 38.5 | 28 | 15 | 50 | 1430° C. | 4 hr. |
| 2  | " | " | " | " | " | " | (B) " | " | 0.2 | 35.5 | " | 30 | " | " | " |
| 3  | " | " | " | " | " | " | (C) " | " | 0.4 | 33.5 | " | 50 | " | " | " |
| 4  | " | " | " | " | " | " | (D) " | " | 0.6 | 31.5 | " | 70 | " | " | " |
| 5  | (B) 30.0 | " | " | " | " | " | (A) " | " | 0.3 | 29.5 | 43 | 15 | " | " | " |
| 6  | " | " | " | " | " | " | (B) " | " | 0.4 | 26.5 | " | 30 | " | " | " |
| 7  | " | " | " | " | " | " | (C) " | " | 0.6 | 24.5 | " | 50 | " | " | " |
| 8  | " | " | " | " | " | " | (D) " | " | 0.8 | 22.5 | " | 70 | " | " | " |
| 9  | (C) 30.0 | " | " | " | " | " | (A) " | " | 0.5 | 25.0 | 58 | 15 | " | " | " |
| 10 | " | " | " | " | " | " | (B) " | " | 0.5 | 22.0 | " | 30 | " | " | " |
| 11 | " | " | " | " | " | " | (C) " | " | 0.7 | 20.0 | " | 50 | " | " | " |
| 12 | " | " | " | " | " | " | (D) " | " | 0.9 | 18.0 | " | 70 | " | " | " |
| 13 | (D) 30.0 | (A) 10.0 | 14.0 | 9.0 | 12.5 | 14.5 | (A) 10.0 | 20.0 | 2.0 | 19.0 | 73 | 15 | 50 | 1430 | 4 hr. |
| 14 | " | " | " | " | " | " | (B) " | " | 2.0 | 16.0 | " | 30 | " | " | " |
| 15 | " | " | " | " | " | " | (C) " | " | 2.2 | 14.0 | " | 50 | " | " | " |
| 16 | " | " | " | " | " | " | (D) " | " | 2.3 | 12.0 | " | 70 | " | " | " |
| 17 | (E) 30.0 | " | " | " | " | " | (A) " | " | 9.2 | 14.5 | 103 | 15 | " | " | " |
| 18 | " | " | " | " | " | " | (B) " | " | 9.2 | 11.5 | " | 30 | " | " | " |
| 19 | " | " | " | " | " | " | (C) " | " | 9.4 | 9.5 | " | 50 | " | " | " |
| 20 | " | " | " | " | " | " | (D) " | " | 9.6 | 7.5 | " | 70 | " | " | " |
| 21 | (C) 40.0 | (A) 10.0 | 15.0 | — | 18.0 | 12.0 | (A) 15.0 | 30.0 | 0.5 | 25.2 | 60 | 15 | 40 | 1410 | 6 hr. |
| 22 | " | " | " | — | " | " | (B) " | " | 0.6 | 25.0 | " | 30 | " | " | " |
| 23 | " | " | " | — | " | " | (C) " | " | 0.9 | 22.0 | " | 50 | " | " | " |
| 24 | " | " | " | — | " | " | (D) " | " | 1.2 | 19.0 | " | 70 | " | " | " |
| 25 | (D) 40.0 | (A) 10.0 | 15.0 | — | 18.0 | 12.0 | (A) 15.0 | 30.0 | 2.5 | 21.5 | 80 | 15 | 40 | 1410 | 6 hr. |
| 26 | " | " | " | — | " | " | (B) " | " | 2.6 | 17.0 | " | 30 | " | " | " |
| 27 | " | " | " | — | " | " | (C) " | " | 2.9 | 14.0 | " | 50 | " | " | " |
| 28 | " | " | " | — | " | " | (D) " | " | 3.2 | 11.0 | " | 70 | " | " | " |
| 29 | (C) 30.0 | (B) 10.0 | 14.0 | 9.0 | 12.5 | 14.5 | (B) 10.0 | 10.0 | 0.5 | 24.0 | 55 | 30 | 60 | 1420 | 5 hr. |
| 30 | (D) " | " | " | " | " | " | (C) " | " | 2.0 | 18.0 | 70 | 50 | " | " | " |
| 31 | (C) " | " | " | " | " | " | (D) " | 30.0 | 0.5 | 24.0 | 55 | 70 | " | " | " |
| 32 | (D) " | " | " | " | " | " | (B) " | 20.0 | 2.0 | 18.0 | 70 | 30 | " | " | " |
| 33 | (A) 30.0 | — | 30.0 | 12.0 | 9.0 | 9.0 | — | 20.0 | 0.1 | 31.5 | 25 | — | 50 | 1430 | 4 hr. |
| 34 | (B) " | — | " | " | " | " | — | " | 0.3 | 23.0 | 40 | — | " | " | " |
| 35 | (C) " | — | " | " | " | " | — | " | 0.4 | 18.0 | 55 | — | " | " | " |
| 36 | (D) " | — | " | " | " | " | — | " | 1.9 | 12.0 | 70 | — | " | " | " |
| 37 | (E) " | — | " | " | " | " | — | " | 9.1 | 7.5 | 100 | — | " | " | " |

*Average rate of rise from 1100° C. to 1350° C.

TABLE 3-1

| Batch No. | Properties of Fired Honeycomb Structures ||||||| Properties of Honeycomb Filters |||
|---|---|---|---|---|---|---|---|---|---|
| | Thermal Expansion Coefficient ($\times 10^{-6}$/°C.) (A/B) | Porosity (%)[1] | 100 μm and Larger Pores (%)[2] | 10-50 μm Pores (%)[2] | Crystallized Cordierite (%)[3] | Thermal Destruction Temperature (°C.)[4] | Initial Pressure Loss (mmH$_2$O)[5] | Trapping Efficiency (%)[6] | Operation Time (min.)[7] |
| 1 | 0.51/0.86 | 52 | 3.0 | 45.0 | 94 | 900 | 135 | 98 | 6 |
| 2 | 0.53/0.90 | 52 | 3.0 | 47.3 | 94 | 900 | 136 | 98 | 7 |
| 3 | 0.55/0.92 | 53 | 4.3 | 51.5 | 93 | 900 | 130 | 97 | 7 |
| 4 | 0.78/1.25 | 53 | 5.2 | 53.0 | 94 | 800 | 131 | 97 | 7 |
| 5 | 0.53/0.91 | 52 | 3.3 | 52.0 | 93 | 900 | 130 | 97 | 7 |
| 6 | 0.65/0.95 | 52 | 4.8 | 63.5 | 93 | 850 | 125 | 97 | 8 |
| 7 | 0.70/1.02 | 53 | 3.9 | 65.1 | 93 | 800 | 120 | 97 | 13 |
| 8 | 0.90/1.25 | 53 | 10.1 | 63.2 | 92 | 750 | 110 | 88 | 20 |
| 9 | 0.50/0.90 | 52 | 3.0 | 52.0 | 92 | 900 | 120 | 98 | 11 |
| 10 | 0.55/0.93 | 52 | 3.0 | 69.5 | 92 | 900 | 110 | 98 | 15 |
| 11 | 0.53/1.01 | 53 | 3.5 | 73.1 | 92 | 900 | 105 | 97 | 20 |
| 12 | 0.65/1.20 | 53 | 11.2 | 63.1 | 92 | 850 | 95 | 88 | 25 |
| 13 | 0.55/1.15 | 52 | 5.2 | 55.0 | 92 | 850 | 110 | 90 | 15 |
| 14 | 0.59/1.19 | 52 | 6.0 | 72.1 | 93 | 850 | 103 | 90 | 20 |
| 15 | 0.65/1.18 | 50 | 8.1 | 74.1 | 92 | 850 | 101 | 90 | 26 |
| 16 | 0.81/1.41 | 52 | 11.1 | 63.2 | 92 | 800 | 95 | 88 | 30 |
| 17 | 0.95/1.48 | 50 | 17.1 | 62.1 | 92 | 750 | 98 | 65 | 25 |
| 18 | 1.15/1.51 | 48 | 16.1 | 63.2 | 91 | 700 | 97 | 62 | 26 |
| 19 | 1.25/1.55 | 49 | 19.9 | 63.1 | 92 | 650 | 96 | 58 | 28 |
| 20 | 1.30/1.59 | 50 | 22.1 | 57.0 | 91 | 650 | 95 | 45 | 40 |
| 21 | 0.52/0.85 | 59 | 2.9 | 51.5 | 90 | 900 | 115 | 98 | 15 |
| 22 | 0.50/0.92 | 58 | 3.4 | 65.0 | 91 | 900 | 110 | 96 | 20 |
| 23 | 0.65/1.10 | 58 | 4.5 | 68.1 | 92 | 850 | 105 | 97 | 27 |
| 24 | 0.82/1.45 | 60 | 12.3 | 58.2 | 91 | 750 | 95 | 82 | 35 |
| 25 | 0.62/1.25 | 60 | 6.1 | 58.1 | 92 | 850 | 115 | 91 | 17 |
| 26 | 0.75/1.30 | 60 | 7.0 | 70.1 | 92 | 800 | 105 | 91 | 24 |
| 27 | 0.80/1.40 | 59 | 10.0 | 73.1 | 92 | 800 | 100 | 90 | 30 |
| 28 | 1.01/1.45 | 59 | 15.1 | 51.5 | 92 | 700 | 93 | 43 | 40 |
| 29 | 0.59/1.05 | 45 | 3.1 | 66.5 | 93 | 850 | 120 | 97 | 12 |
| 30 | 0.72/1.15 | 46 | 6.5 | 72.1 | 90 | 800 | 110 | 90 | 18 |
| 31 | 0.58/1.07 | 60 | 3.2 | 68.1 | 93 | 850 | 110 | 95 | 25 |
| 32 | 0.75/1.18 | 59 | 7.5 | 70.9 | 91 | 800 | 100 | 91 | 31 |
| 33 | 0.65/0.98 | 49 | 4.5 | 57.5 | 92 | 850 | 140 | 99 | 4 |
| 34 | 0.75/1.12 | 50 | 5.2 | 58.3 | 92 | 850 | 135 | 97 | 5 |
| 35 | 0.84/1.26 | 49 | 5.2 | 58.2 | 92 | 750 | 125 | 96 | 6 |
| 36 | 1.15/1.45 | 48 | 9.8 | 60.9 | 92 | 700 | 120 | 75 | 18 |
| 37 | 1.43/1.59 | 46 | 15.0 | 60.7 | 91 | 650 | 95 | 50 | 25 |

NOTES
[1] Volume percent measured by mercury penetration method (true specific gravity of cordierite = 2.52)
[2] Measured by mercury penetration method
[3] Measured by X-ray diffraction (Quantitative determination value) (Internal standard: ZnO)
[4] Temperature in an electric furnace, at which the filter was destroyed upon air cooling after 1-hr heating
[5] Room temperature = 20° C.,
Effective filter diameter = 58 mm,
Gas flow rate = 1 Nm$^3$/min.
[6] Gas temperature = 200° C.,
Amount of soot in the gas = 13 g/hr.,
Gas flow rate = 2.4 Nm$^3$/min.
The efficiency values in TABLE 3 are average values at the pressure loss values 600 mmH$_2$O, 1200 mmH$_2$O, 1800 mmH$_2$O, 2400 mmH$_2$O, and 3000 mmH$_2$O.
[7] Gas temperature = 200° C.,
Amount of soot in the gas = 13 g/hr.,
Gas flow rate = 2.4 Nm$^3$/min.
The times indicated in TABLE 3 are time durations between the start of the gas flow and the time when the pressure loss increased to 1600 mmH$_2$O.

EXAMPLE 2

Green cylindrical honeycomb structures each having a rib (partition wall) thickness of 430 μm, 16 cells per square centimeter (cm$^2$), a diameter of 229 mm and a height of 305 mm were prepared by extruding batch No. 11 prepared according to the present invention, and batch No. 35 which is a comparative example. Then, the green honeycomb structures were dried, and fired by heating them to the maximum temperature of 1420° C. at a rate of 40° C./hr. and holding them for five hours at a temperature lower than the maximum temperature.

The thus prepared two sintered honeycomb structures were evaluated and tested in terms of the thermal expansion coefficient at 40°-800° C., porosity, percentage of the 100 μm or larger pores, percentage of the 10-50 μm pores, and amount of the crystallized cordierite. The results of the evaluation and test are indicated in TABLE 4.

The sintered honeycomb structures were closed at one of the opposite ends, by suitable plugs as indicated in FIGS. 2(a) and 2(b), whereby the corresponding porous ceramic honeycomb filters were produced. These filter specimens were evaluated or tested in terms of the initial pressure loss, trapping efficiency, nominal operation time, and destruction temperature when the specimens contaminated or clogged with deposited particulate matters (soot) were heated to burn out the contaminants, for reclaiming the same. The results of the evaluation and test are also indicated in TABLE 4.

It will be understood from TABLE 4 that the filter specimen corresponding to batch No. 11 according to the present invention has comparatively high trapping efficiency, comparatively long nominal operation time, reduced thermal expansion coefficient, and comparatively high thermal destruction temperature upon heating thereof for reclaiming purpose.

TABLE 4

| PROPERTIES OF SINTERED HONEYCOMB STRUCTURES | Batch No. | |
| --- | --- | --- |
| | 11 | 35 |
| Thermal Expansion Coefficient ($\times 10^{-6}/40\text{-}800°$ C.) | | |
| A Axis | 0.52 | 0.82 |
| B Axis | 1.01 | 1.31 |
| Porosity (%)*1 | 52 | 49 |
| Pores (%)*2 | | |
| >100 μm | 3.2 | 5.2 |
| 10-50 μm | 73.5 | 58.7 |
| Amount of Crystallized Cordierite*3 | 92 | 92 |
| PROPERTIES OF HONEYCOMB FILTERS | | |
| Initial Pressure Loss (mmH$_2$O)*4 | 125 | 133 |
| Trapping Efficiency (%)*5 | 95 | 95 |
| Operation Time (min.)*6 | 500 | 250 |
| DESTRUCTION TEMPERATURE (°C.)*7 | 950 | 850 |

*1Volume percent measured by mercury penetration method (true specific gravity of cordierite = 2.52)
*2Measured by mercury penetration method
*3Measured by X-ray diffraction (Quantitative determination value) (Internal standard: ZnO)
*4Room temperature = 20° C.;
Effective filter diameter = 215 mm;
Gas flow rate = 8 Nm$^3$/min.
*5Gas temperature = 200° C.;
Amount of soot in the gas = 13 g/hr.;
Gas flow rate = 9 Nm$^3$/min.
The efficiency values in TABLE 4 are average values at the pressure loss values 1000 mmH$_2$O, 1500 mmH$_2$O, 2000 mmH$_2$O, and 2500 mmH$_2$O.
*6Gas temperature = 200° C.;
Amount of soot in the gas = 13 g/hr.;
Gas flow rate = 9 Nm$^3$/min.
The times indicated in TABLE 4 are time durations between the start of the gas flow and the time when the pressure loss increased to 1600 mmH$_2$O.
*7Amount of soot = 120 g/hr.;
Contamination gas flow rate = 9 Nm$^3$/min.;
Burning gas temperature = 600° C.;
Burning gas flow rate = 1.5 Nm$^3$/min.
The temperatures indicated in TABLE 4 are those at which the filters were destroyed during temperature rise due to burning of the soot deposited on the filter. The maximum temperature of the filter reached by burning of the soot varies with the amount of the deposited soot.

We claim:

1. A method of producing a porous cordierite ceramic honeycomb filter, comprising the steps of:
preparing a starting composition including a talc powder component and a silica powder component, such that particles of said talc powder component and said silica powder component whose size is at least 150 μm constitute not greater than 3% by weight of said starting composition, while particles of said talc and silica powder components whose size is not greater than 45 μm constitute not greater than 25% by weight of said starting composition, said talc powder component having an average particle size of not greater than 80 μm, and said silica powder component having an average particle size of 30-50 μm;
forming a green body in the shape of said porous ceramic honeycomb filter by using said starting composition; and
firing said green body to react said starting composition to form cordierite and produce said porous cordierite ceramic honeycomb filter.

2. A method according to claim 1, wherein said particles whose size is not less than 150 μm constitute not more than 1% by weight of said starting composition, while said particles whose size is not more than 45 μm constitute not more than 20% by weight of said starting composition.

3. A method according to claim 1, wherein said starting composition further includes at least one material selected from the group consisting of kaoline, calcined kaoline, alumina and aluminum hydroxide.

4. A method according to claim 3, wherein said starting composition comprises 42-56% by weight of SiO$_2$, 30-45% by weight of Al$_2$O$_3$ and 12-16% by weight of MgO.

5. A method according to claim 1, further comprising adding a pore-forming agent to said starting composition to prepare a mixture of said starting composition and said pre-forming agent, and wherein said green body is formed of said mixture.

6. A method according to claim 5, further comprising adding at least one of a plasticizer and a binder to said mixture, before said green body is formed.

7. A method according to claim 1, wherein said green body is formed by extrusion.

8. A method according to claim 1, wherein said green body is fired at a temperature between 1380° C. and 1440° C.

* * * * *